UNITED STATES PATENT OFFICE 2,502,431

PROCESS FOR THE PRODUCTION OF DIENE HYDROCARBONS

John W. Copenhaver and Donald E. Sargent, Easton, Pa., assignors to General Aniline & Film Corporation, New York, N. Y., a corporation of Delaware No Drawing. Application November 15, 1945, Serial No. 628,983

7 Claims. (Cl. 260—681)

The present invention relates to the synthesis of butadiene and other conjugated diene hydrocarbons from monovinyl or ethylenically unsaturated ethers and related compounds.

In accordance with this invention, butadiene and other conjugated diene hydrocarbons, represented by the formula:

Formula I 

in which the R's represent hydrogen or alkyl or aralkyl radicals, are obtained in good yield from ethylenically unsaturated ethers of the type represented by the general formula:

Formula II 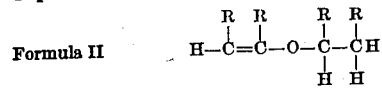

in which the R's stand for a member of the group consisting of hydrogen and alkyl, aryl and aralkyl radicals, including groups derived by the substitution thereof, by subjecting such ethylenically unsaturated ethers, in vapor phase and at an elevated temperature, to the action of a catalyst in the presence of a vaporous diluent.

While it has heretofore been proposed to produce butadiene from ethyl vinyl ether by passing the vaporized ether over alumina at 360–460° C., the yields obtained by this process have been relatively low. We have discovered that if a substantial amount of a vaporous, non-aqueous diluent is present during the passage of the vinyl ether over the alumina or other catalyst, the yield obtained is materially increased. We have also discovered that when ethylenically unsaturated ethers, other than ethyl vinyl ether, are treated in accordance with the process of the present invention, butadiene and other conjugated diene hydrocarbons can be obtained in good yield.

As heretofore indicated, a wide variety of ethylenically unsaturated ethers may be converted into conjugated diene hydrocarbons in accordance with the present invention. These ethylenically unsaturated ethers may be exemplified by the vinyl, alkyl vinyl or aryl vinyl ethers of alkyl alcohols, such as, vinyl, propenyl, isopropenyl or butenyl ethers of such alkyl alcohols, as methyl, ethyl, propyl, isopropyl, butyl, isobutyl, and higher alkyl alcohols, as lauryl or octadecyl alcohol or montanol, and of such aralkyl alcohols as phenyl ethyl alcohol, phenyl propyl alcohol and phenyl methyl carbinol. As examples of aryl vinyl alcohols whose ethers, with the alkyl or aralkyl alcohols such as those mentioned immediately above, may be converted into conjugated diene hydrocarbons, may be mentioned α-phenyl vinyl alcohol and β-phenyl vinyl alcohol. It should also be understood that in place of the vinyl ethers, themselves, we may employ substances which are derived therefrom by the addition of groups to the ethylene double bond, which, under the conditions of the reaction, are readily removed so as to again yield the corresponding vinyl ether. Thus, compounds of the type

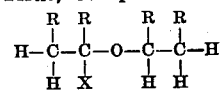

wherein R is defined as above and wherein X represents, for example, alkoxy, aryloxy, aralkoxy, halogen or hydroxy (or an ester thereof, such as —$SO_3H$, —$OSO_2H$, —$ONO$, —$ONO_2$, —$OCOR$, and the like), which may readily be removed together with a hydrogen on the β-carbon atoms as HX, so as to produce the corresponding vinyl ether, may be characterized as "potential" vinyl ethers and in the present application are included as the equivalent of vinyl ethers. They may be exemplified by the following compounds: acetals, β-alkoxy butyrals, α-halogen ethers, and the like. It should also be understood that mixtures of two or more vinyl ethers, or of vinyl ethers and potential vinyl ethers, may advantageously be treated in accordance with the present invention for the production of diene hydrocarbons.

The ethylenically unsaturated ethers, such as those mentioned in the preceding paragraph, are vaporized and mixed with a vaporous diluent. We have found that improved results are obtained when employing a wide variety of vaporous, non-aqueous diluents and have used such substances as benzene, acetic acid, carbon dioxide, nitrogen and other organic and inorganic vapors or gases which are inert under the conditions of the reaction. In addition, we have employed as the diluent in practicing the present invention, the vapors of various alcohols, particularly the lower aliphatic alcohols, methanol and ethanol. Such alcohols appear to function both as inert diluents and, in addition, possibly enter into the reaction to a limited extent, since the use of alcohols, particularly ethanol and, to a lesser extent, slightly higher aliphatic alcohols, propanol, butanol and the like, influence the type of product which is obtained. In the production of butadiene from ethyl vinyl ether and other alkyl vinyl ethers, we have found that particularly good yields are obtained when ethyl alcohol is employed as the diluent. We have also found that slightly smaller amounts of ethyl alcohol can be employed as the diluent to obtain improved results than are necessary when other diluents are used. In general, the ratio of diluent to vinyl ether which we prefer to use will be in the range of 1:1 to 10:1, the optimum range for any particular diluent and vinyl ether and other reaction conditions being determinable by experiment.

The process of the present invention is catalyzed by a wide variety of catalysts and all catalysts which are known to be active in dehydration and rearrangement reactions and which are solid at the temperature of reaction or which are deposited on solid carriers are suitable for use in the production of butadiene from vinyl ethers. Such diverse catalysts as the oxides, sulfides, carbonates, hydroxides, silicates, phosphates, halides, etc., of elements chosen from the group which consists of aluminum, molybdenum, tungsten, thorium, magnesium, calcium, boron, silicon, titanium, vanadium, chromium, manganese, iron, cobalt, nickel, copper, zinc, zirconium, silver, cadmium, etc., and in addition, such materials as acidic clays, kieselguhr, glass beads, silica gel, graphite, carbon, Carborundum, pumice, activated charcoal, diatomaceous earth, fuller's earth, etc., have been employed in this conversion. In general, we have found that the catalysts which are useful for the production of butadiene from acetaldehyde and ethyl alcohol are operable in our process. Particularly good yields have been obtained with aluminum oxide, 10% tungstic oxide on aluminum oxide, 10% molybdenum sulfide on aluminum oxide, 10% zinc oxide on aluminum oxide, and certain acidic or acid-washed clays. It should be understood that one or more of the above materials may be employed under a variety of conditions including mixtures, etc.

The reaction may be carried out through a wide temperature range and the process is operable between 200° C. and 700° C. However, in order to ensure a relatively rapid reaction rate, a temperature of at least 350° C. is preferred and temperatures above 550° C. are generally not preferred since their use may create some difficulties in the reaction, such as some decomposition of desired products. The preferred temperature range is, therefore, from 350° C. to 550° C.

The present invention may advantageously be practiced at atmospheric pressure. However, the pressure employed does not appear to be highly critical and higher or lower pressures have been employed without noticeable adverse effects.

The time of contact between the vinyl ether and the catalyst does not appear to be highly critical. Contact times of from 1 second to approximately 1 minute have been employed and have been found to be satisfactory. In commercial operations, a contact time of from 1 to 10 seconds will probably be preferred; however, shorter or longer times may be employed if desired.

The following specific examples illustrate the practice of the present invention:

EXAMPLE 1

A mixture composed of 144 parts (2 moles) of ethyl vinyl ether, 92 parts (2 moles) of ethanol and 164 parts (9.1 moles) of water was vaporized in a preheater at 135–155° C. The vapors were passed over 100 parts of a 10% tungstic oxide on alumina catalyst at 400–534° C. with a contact time of 1.6 seconds. The reaction products were condensed and distilled to yield 15 parts of butadiene.

Under similar conditions but in the absence of any ethanol, butadiene was obtained in a yield of only 4.5 parts, while when other inert diluents, such as nitrogen, carbon dioxide, and the like, are employed, the results substantially parallel those obtained with water.

EXAMPLE 2

A mixture of ethyl vinyl ether (144 parts, 2 moles) and ethanol (92 parts, 2 moles) was slowly added to a preheater maintained at 175–240° C. The heated vapors were then passed over 100 parts of a 10% tungstic oxide on alumina catalyst at 400–410° C. A contact time of 3.7 seconds was used. On condensing and distilling the reaction products, 18 parts of butadiene were recovered.

Other experiments, using different ratios of alcohol to ether and different catalysts, are tabulated below.

*Table I*

| Expt. No. | Temp., °C. | Contact Time, Sec. | Catalyst | Catalyst, Volume | Ethyl Vinyl Ether, Parts | Ethanol, Parts | Butadiene, Parts |
|---|---|---|---|---|---|---|---|
| 2 | 440–466 | 6.3 | Aluminum oxide | 100 | 144 | 92 | 30.5 |
| 3 | 456–492 | 1.93 | ___do___ | 50 | 144 | 276 | 54.5 |
| 4 | 418–432 | 1.95 | ___do___ | 50 | 144 | 460 | 66.8 |
| 5 | 400–418 | 6.0 | 9% molybdenum oxide on alumina. | 100 | 144 | 92 | 14.0 |

EXAMPLE 3

A mixture of 72 parts (1 mole) of ethyl vinyl ether and 160 parts (5 moles) of methanol were passed in vapor phase over 50 parts of activated alumina at 454–486° C. A contact time of 2.1 seconds was used. On condensing and distilling the reaction product, 4 parts of butadiene were recovered.

EXAMPLE 4

A mixture of 118 parts (1 mole) of diethyl acetal and 92 parts (2 moles) of ethanol were passed in the vapor phase over 50 parts of activated alumina at 410–422° C. and a contact time of 2.65 seconds. The reaction products were condensed and distilled and butadiene isolated in a yield of 19.5 parts.

Under similar conditions but in the absence of ethanol as a diluent, a contact time of 11.2 seconds was required in order to obtain a similar yield of butadiene.

EXAMPLE 5

One hundred forty-eight parts (1 mole) of β-methoxy butyraldehyde dimethyl acetal were mixed with 138 parts (3 moles) of ethanol and the mixture vaporized and passed in vapor phase over 50 parts of activated alumina oxide at 440–458° C. and a contact time of 2.7 seconds. The reaction products were condensed and separated by distillation, yielding 11.5 parts of butadiene.

From a current commercial standpoint, the present invention is of greatest interest for the production of butadiene-1,3. The most satisfactory yields of butadiene can be obtained in accordance with the present invention by charging to the process ethyl vinyl ether which contains 4 carbon atoms or its equivalent, diethyl acetal, for example, as the ethylenically unsaturated ether which is treated. In this case, all the R's in Formula I above are hydrogen and a rearrangement and dehydration of the following type seems to take place:

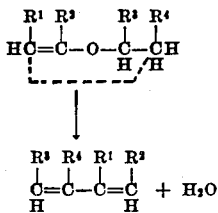

It will be understood, however, that the process of the present invention may be used to produce other conjugated diene hydrocarbons which may broadly be considered as substituted butadienes by employing, in place of ethyl vinyl ether, a vinyl ether of the type specified in Formula II above in which one or more of the R's is an alkyl, aryl or aralkyl radical. Thus, in order to produce a conjugated diene containing 5 carbon atoms which may be considered as a methyl substituted butadiene, i. e., pentadiene-1,3 or isoprene, the ethylenically unsaturated ether charged to the process may be one containing a total of 5 carbon atoms, such as, ethyl propenyl or isopropenyl ether or propyl or isopropyl vinyl ether, which may be considered as methyl substituted ethyl vinyl ethers. Other alkyl substituted butadienes which contain the same number of carbon atoms as the total number of carbon atoms in the unsaturated ether from which they are produced may be obtained by treating the vinyl ethers of higher alkyl alcohols or the ethyl or higher alkyl ethers of alpha-unsaturated aliphatic alcohols. In case a conjugated diene containing an aryl radical is desired, the ethylenically unsaturated ether charged to the process may be one containing an aryl radical. In case of compounds of the type specified in Formula II above, wherein one or more of the R's is an aralkyl group, the diene which is obtained will correspond to that outlined in Formula I above in which one of the R's is the corresponding aralkyl group, while if one or more of the R's in Formula II is an aryl radical, the diene which is produced therefrom will be represented by a compound of the type outlined in Formula I in which one of the R's is an aryl radical.

The exact nature of the reaction which takes place in accordance with the present invention is not fully understood and we do not, therefore, limit ourselves to any particular theory of operation, but have set forth and are claiming a particular process, which we have found to be useful for the production of conjugated dienes from ethylenically unsaturated vinyl ethers of the type specified and their equivalents.

We claim:

1. A process of producing conjugated diene hydrocarbons which comprises contacting in the absence of added olefines and in vapor phase a mixture of a compound selected from the class consisting of ethylenically unsaturated ethers of the type:

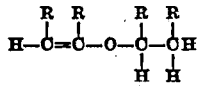

and compounds of the type:

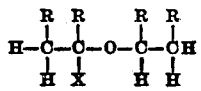

in which the R's stand for members of the group consisting of hydrogen and alkyl, aryl and aralkyl radicals, and X represents a member of the group consisting of halogen and alkoxy which may readily be removed together with a hydrogen on the beta carbon atom, in admixture with not less than an equivalent amount of an alkanol containing from 1 to 4 carbon atoms, with a dehydration catalyst at a temperature of from 350–550° C.

2. A process as defined in claim 1, wherein the alkanol specified is ethyl alcohol.

3. A process of producing conjugated diene hydrocarbons which comprises contacting in the absence of added olefines and in vapor phase an alkyl vinyl ether containing at least two carbon atoms in said alkyl group in admixture with not less than an equivalent amount of an alkanol containing from 1 to 4 carbon atoms, with a dehydration catalyst at a temperature of from 350–550° C.

4. A process of producing conjugated diene hydrocarbons which comprises contacting in the absence of added olefines and in vapor phase an alkyl vinyl ether containing at least 2 carbon atoms in said alkyl group in admixture with not less than an equivalent amount of ethyl alcohol, with a dehydration catalyst at a temperature of from 350–550° C.

5. A process of producing butadiene which comprises contacting in the absence of added olefines and in vapor phase ethyl vinyl ether in admixture with not less than an equivalent amount of ethyl alcohol with a dehydration catalyst at a temperature of from 350–550° C.

6. A process of producing conjugated diene hydrocarbons which comprises contacting in the absence of added olefines and in vapor phase an alkyl vinyl ether containing at least 2 carbon atoms in the alkyl group in admixture with not less than an equivalent amount of ethyl alcohol with an activated alumina dehydration catalyst at a temperature of from 350–550° C.

7. A process of producing butadiene which comprises contacting in the absence of added olefines and in vapor phase ethyl vinyl ether in admixture with not less than an equivalent amount of ethyl alcohol with an activated alumina dehydration catalyst at a temperature of from 350–550° C.

JOHN W. COPENHAVER.
DONALD E. SARGENT.

REFERENCES CITED

The following references are of record in the file of this patent:

UNITED STATES PATENTS

| Number | Name | Date |
|---|---|---|
| 2,224,912 | Hill et al. | Dec. 17, 1940 |
| 2,310,809 | Reppe et al. | Feb. 9, 1943 |
| 2,337,059 | Mikeska et al. | Dec. 21, 1943 |
| 2,415,878 | Hale | Feb. 18, 1947 |

FOREIGN PATENTS

| Number | Country | Date |
|---|---|---|
| 379,674 | Great Britain | Aug. 30, 1932 |

OTHER REFERENCES

Egloff et al., The Oil and Gas Journal, December 17, 1942, pages 36–37.

Egloff et al., Chem. Rev. vol. 36, 111–117 (1945).

Ostromysslenskii, J. Russ. Phys. Chem. Soc., vol. 47, 1472–94 (1915); Eng. translation available in Div. 31, pages 7 to 9 pertinent.